US008101007B2

(12) United States Patent
Sugitatsu et al.

(10) Patent No.: US 8,101,007 B2
(45) Date of Patent: Jan. 24, 2012

(54) METHOD FOR REDUCTION TREATMENT OF ELECTRIC FURNACE DUST

(75) Inventors: Hiroshi Sugitatsu, Kobe (JP); Hiroshi Tamazawa, Kobe (JP)

(73) Assignee: Kobe Steel Ltd., Kobe-shi (JP)

(*) Notice: Subject to any disclaimer, the term of this patent is extended or adjusted under 35 U.S.C. 154(b) by 0 days.

(21) Appl. No.: 12/670,942

(22) PCT Filed: Jul. 24, 2008

(86) PCT No.: PCT/JP2008/063257
§ 371 (c)(1),
(2), (4) Date: Jan. 27, 2010

(87) PCT Pub. No.: WO2009/017019
PCT Pub. Date: Feb. 5, 2009

(65) Prior Publication Data
US 2010/0192726 A1 Aug. 5, 2010

(30) Foreign Application Priority Data
Jul. 31, 2007 (JP) ................................. 2007-199600

(51) Int. Cl.
C22B 1/244 (2006.01)
C21B 13/08 (2006.01)
(52) U.S. Cl. .......................................... 75/484; 75/772
(58) Field of Classification Search .............. 75/10.13, 75/770–773, 479
See application file for complete search history.

(56) References Cited

U.S. PATENT DOCUMENTS

| 3,278,293 | A | * | 10/1966 | Smith | 75/316 |
|---|---|---|---|---|---|
| 4,004,918 | A | * | 1/1977 | Fukuoka et al. | 75/10.5 |
| 6,083,295 | A | * | 7/2000 | Clark | 75/479 |
| 6,342,089 | B1 | * | 1/2002 | McGaa | 75/319 |
| 6,773,486 | B2 | * | 8/2004 | Vayda | 75/709 |
| 6,802,886 | B2 | * | 10/2004 | Hoffman et al. | 75/484 |
| 7,175,691 | B2 | | 2/2007 | Sugitatsu et al. | |
| 2003/0233912 | A1 | | 12/2003 | Sugitatsu et al. | |
| 2007/0079667 | A1 | * | 4/2007 | Sugitatsu et al. | 75/766 |
| 2010/0160507 | A1 | * | 6/2010 | Bauer et al. | 524/115 |

FOREIGN PATENT DOCUMENTS

| JP | 55 123819 | 9/1980 |
|---|---|---|
| JP | 61 133133 | 6/1986 |
| JP | 9 209047 | 8/1997 |
| JP | 6 174383 | 6/1999 |

(Continued)

OTHER PUBLICATIONS

English translation of JP 55-123819 published Sep. 24, 1980.*

*Primary Examiner* — George Wyszomierski
*Assistant Examiner* — Tima M McGuthry Banks
(74) *Attorney, Agent, or Firm* — Oblon, Spivak, McClelland, Maier & Neustadt, L.L.P.

(57) ABSTRACT

The method includes the steps of: adding a carbonaceous material B and a binder C, and optionally water, to electric furnace dust A generated in a steelmaking electric furnace 1, to form a powdery mixture D having a water content of 0.5 to 3 mass %; compacting the powdery mixture D into a raw briquette E; and charging the raw briquette without drying into a rotary hearth furnace 5 and thermally reducing the raw briquette to obtain a reduced iron briquette F and a crude zinc oxide G.

14 Claims, 2 Drawing Sheets

FOREIGN PATENT DOCUMENTS

| | | |
|---|---|---|
| JP | 11 193423 | 7/1999 |
| JP | 11 337264 | 12/1999 |
| JP | 2003 129140 | 5/2003 |
| JP | 2004 35950 | 2/2004 |
| JP | 2004 76152 | 3/2004 |
| JP | 2005 097665 | 4/2005 |
| JP | 2005 213461 | 8/2005 |
| JP | 2006 124765 | 5/2006 |

* cited by examiner

METHOD FOR REDUCTION TREATMENT OF ELECTRIC FURNACE DUST

This application claims priority from Patent Application Ser. No. PCT/JP2008/063257 filed on Jul. 31, 2007.

TECHNICAL FIELD

The present invention relates to a method of subjecting electric furnace dust generated in a steelmaking electric furnace to a reduction treatment in a rotary hearth furnace.

BACKGROUND ART

Electric furnace dust generated from a steelmaking electric furnace is dust in ultrafine powder form, which contains not only iron but also nonferrous metal, such as zinc and lead. Heretofore, with a view to effectively utilizing such electric furnace dust, various treatment methods have been proposed.

For example, there has been proposed a technique of adding a carbonaceous material to electric furnace dust, granulating the mixture with water into pellets, heating the pellets in a rotary kiln to collect zinc and lead through reduction and volatilization thereof, and collect iron in the form of reduced iron pellets through reduction thereof (see, for example, Patent Document 1). The pelletization of electric furnace dust with addition of a carbonaceous material thereto offers the following effects.

(1) The carbonaceous material contained in the pellets promotes the reduction and volatilization of zinc and lead, and the reduction of iron.

(2) Although a rotary kiln is generally installed in a location away from an electric furnace, scattering of a fine powder during transportation can be prevented by pre-pelletizing electric furnace dust near the electric furnace to transport it to the rotary kiln in the form of a pellet.

However, the above pellet is easily broken/pulverized by shock arising from tumbling in the rotary kiln. This causes problems such as formation of deposit on a furnace wall or occurrence of a large amount of dust loss.

In view of such problems, there has been proposed a technique using a rotary hearth furnace in place of the rotary kiln to heat and reduce pellets on a hearth rotated in a horizontal plane (see, for example, Patent Document 2). This technique makes it possible to collect zinc and lead while collecting iron in the form of reduced iron pellets, without breakage/pulverization of the pellets.

However, this technique, in the same manner as that in the technique using the rotary kiln, requires addition of a carbonaceous material and a large amount of water to electric furnace dust for palletizing it, which raises a water content in a pellet (raw pellet) to 7 to 15 mass %. Although the Patent Document 2 discloses a direct charge of raw pellets into a rotary hearth furnace without drying, to heat them (the paragraph [0013], FIG. 2 in the Patent Document 2), the sudden charge of raw pellets containing such a large amount of water into a high-temperature atmosphere involves a rapid application of heat to the pellets to cause a rapid vaporization of the water in the pellets, thus generating a gas pressure of the water which is likely to cause bursting of the pellets.

In order to avoid the bursting of the pellets, there has been proposed a technique of providing a preheating zone in a preceding stage relative to a heating zone of the rotary hearth furnace, and preheating the pellets in the preheating zone at a temperature in a relative low region to slowly remove water from the pellets while preventing the occurrence of bursting (see Patent Document 3). However, this technique involves a significant lowering in treatment rate of electric furnace dust when a size of the rotary hearth furnace is maintained, or involves a significant increase in size of the rotary hearth furnace when the treatment rate of electric furnace dust is ensured.

It can be also contemplated to charge raw pellets into a rotary hearth furnace after drying the raw pellets using a drying machine to reduce a water content in each of the pellets to 1 mass % or less (see Patent Document 4). The charge of the sufficiently dried pellets into the rotary hearth furnace ensures the prevention of the bursting and the sufficient treatment rate of electric furnace dust while maintaining the size of the rotary hearth furnace; however, it requires an additional drying machine and large energy for the drying.

In view of the above problems, the applicant has proposed, in place of the technique of pelletizing a powdery mixture comprising electric furnace dust and a carbonaceous material, a technique of briquetting the powdery mixture through a compacting process, and then charging the briquettes in a rotary hearth furnace (see Patent Document 5).

The briquetting based on a compacting process, which does not generally require a large amount of water as compared with the pelletization based on tumbling granulation, can offer expectation of omitting the drying machine and drastically reducing energy necessary for drying of the briquettes.

However, there is unknown a briquette production condition (particularly, about an adequate water content) for reliably preventing briquettes from bursting thereof in a rotary hearth furnace while giving the briquettes a enough strength to resist a handling thereof after compacting through until charging into the rotary hearth furnace.

[Patent Document 1] JP 6-174383A
[Patent Document 2] JP 9-209047A
[Patent Document 3] JP 11-337264A
[Patent Document 4] JP 11-193423A
[Patent Document 5] JP 2004-76152A

DISCLOSURE OF THE INVENTION

In view of the above circumstances, it is an object of the present invention to provide a method of compacting a powdery mixture of electric furnace dust generated in a steelmaking electric furnace and a carbonaceous material, into a briquette, and subjecting the briquette to a thermal reduction treatment in a rotary hearth furnace, the method enabling reducing energy necessary for drying of the briquette while giving the briquettes a enough strength to resist a handling thereof after compacting through until charging into the rotary hearth furnace and preventing bursting thereof in the rotary hearth furnace. In order to achieve this object, the method for reduction treatment of electric furnace dust according to the present invention comprises a mixing step of adding a carbonaceous material, a binder, and (if needed) water, to electric furnace dust generated in a steelmaking electric furnace, to form a powdery mixture having a water content of 0.5 to 3 mass %, a compacting step of compacting the powdery mixture into a raw briquette, and a reduction step of charging the raw briquette without drying into a rotary hearth furnace and thermally reducing the raw briquette to obtain a reduced iron briquette and a crude zinc oxide.

DESCRIPTION OF THE PREFERRED EMBODIMENTS

With reference to the drawings, an embodiment of the present invention will now be specifically described.

Embodiment

Figure 1:
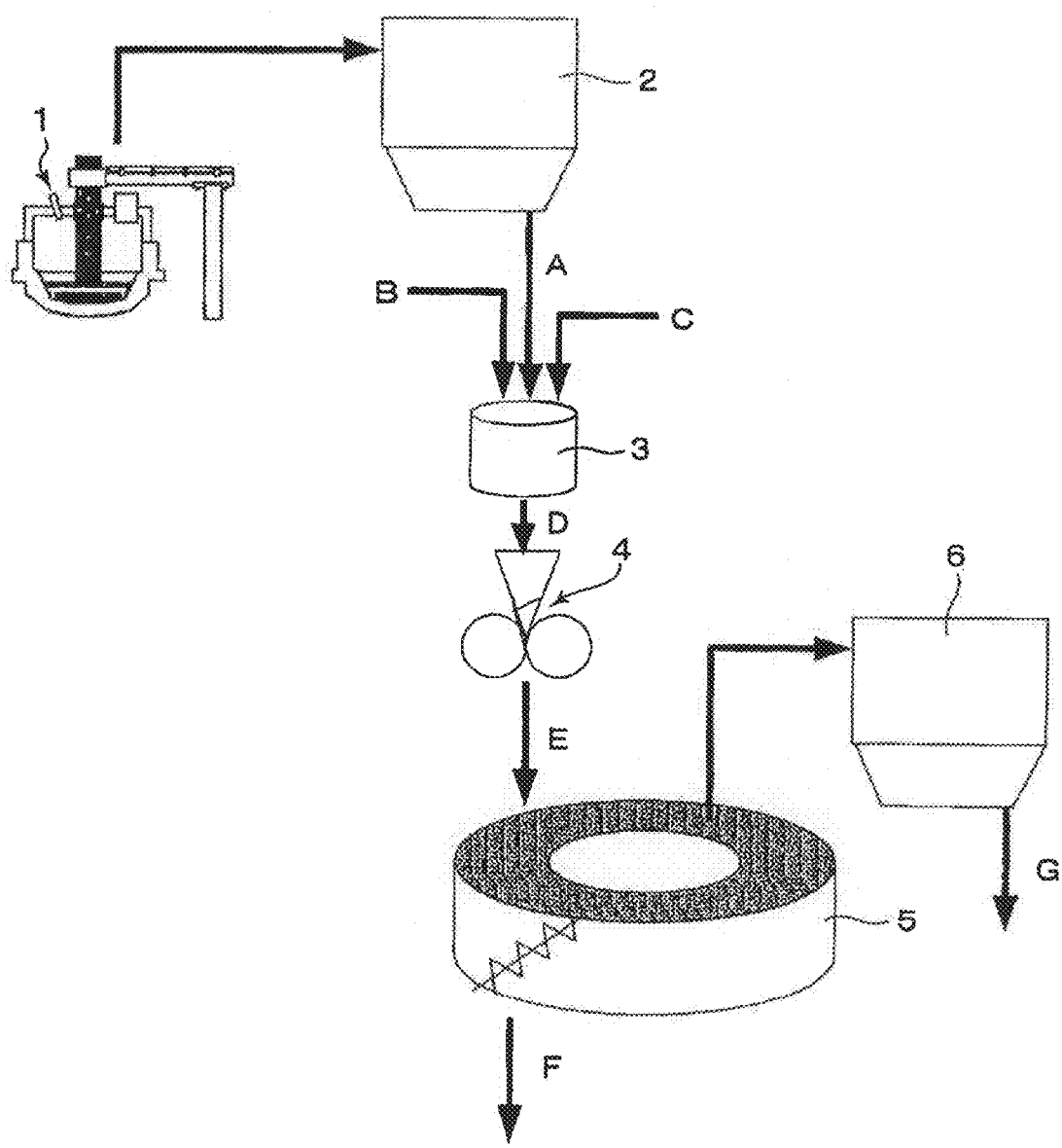
FIG. 1 is a schematic flow diagram showing a steelmaking electric furnace, and a reduction treatment system according to one embodiment of the present invention, for reduction treatment of electric furnace dust collected from the steelmaking electric furnace.

FIG. 1 is a schematic flow diagram showing a steelmaking electric furnace 1, and a reduction treatment system according to one embodiment of the present invention, for a reduction treatment of electric furnace dust collected from the steelmaking electric furnace 1 by a dust collector 2. This reduction treatment system comprises a mixer 3, a briquetting machine 4, a rotary hearth furnace 5, and a dust collector 6.

In the steelmaking electric furnace 1 is generated electric furnace dust A, which is trapped by the dust collector 2 such as a bag filter in a dry manner, and then temporarily stored in a given storage tank through a screw conveyer, a flight conveyer, a rotary valve, pneumatic means or the like.

(Mixing Step)

The electric furnace dust A is extracted from the storage tank in a given amount. To the electric furnace dust A is added a given amount of carbonaceous material B such as coke powder and further an appropriate amount of binder C such as molasses. They are mixed in the mixer 3 to form a powdery mixture D. The mixing amount of the carbonaceous material B may be determined based on an amount of carbon necessary for reduction of metal elements contained in the electric furnace dust such as iron and zinc. The mixing in the mixer 3 involves addition of water, if necessary. Specifically, the addition of water is performed so as to allow a water content of the obtained powdery mixture D to fall within the range of 0.5 to 3 mass %. If not necessary, no water is added. If necessary, only a minimum amount of water is added for the mixing.

The reason why a lower limit of the water content in the powdery mixture D should be at 0.5 mass % is that the presence of a slight amount of water makes it possible to more reliably ensure a strength of a raw briquette E to be formed in an after-mentioned manner. On the other hand, the reason why an upper limit of the water content in the powdery mixture D should be at 3 mass % is that the water content greater than the upper limit increases a risk of occurrence of bursting at the time of the charge of the raw briquette E into the rotary hearth furnace 5 (see the after-mentioned Example 1).

(Compacting Step)

The powdery mixture D having a water content adjusted in the above manner is compacted into a raw briquette (hereinafter referred to simply as "briquette" on a case-by-case basis) E having a given shape such as an almond-like shape or a pillow-like shape, by the briquetting machine (e.g., a twin-roll type briquetting machine 4). The briquetting machine 4 preferably has a compacting linear pressure set at 44 kN/cm or more, more preferably 64 kN/cm or more for a sufficient strength of the raw briquette E (see the after-mentioned Example 3).

(Reduction Step)

The raw briquette E compacted and formed in the briquetting machine 4 is directly, without a drying treatment, charged on a hearth (not shown) in the rotary hearth furnace 5, and thermally reduced while being turned 360 degrees in the furnace. Iron contained in the raw briquette E is collected in the form of a reduced iron briquette F, and nonferrous metals such as zinc contained in the raw briquette E is trapped in the form of a crude zinc oxide G, by the dust collector 6 such as a bag filter. The water content in the raw briquette E, which is limited to 3 mass % or less, can prevent bursting even when the raw briquette E is charged into a high-temperature atmosphere within the rotary hearth furnace 5.

In the above described conventional technique designed to form a pellet instead of the raw briquette E, a pellet is, for avoiding the bursting, dried by a drier or the like in advance of setting in a rotary hearth furnace to have a water content limited to 1 mass % or less. Specifically, since the pellet is softly compacted by a relatively small compression force arising from tumbling, bursting is likely to occur even by a relatively low water vapor pressure, which occurs necessity of minimization of the water content for preventing the bursting.

In contrast, the briquette, which is solidly compacted by a significantly high compression force, for example, from twin rolls, can prevent the occurrence of bursting even under a higher water vapor pressure, as compared with the pellet. This permits the water content in the briquette to be higher than that in the pellet.

The collected reduced iron briquette F can be recycled as a part of raw materials of the steel making electric furnace 1, or as charge for a blast furnace. The crude zinc oxide G can be recycled as a raw material for zinc refining.

When the electric furnace dust is recycled in the form of a reduced iron briquette as described above, the reduced iron briquette is preferably returned to the steelmaking electric furnace in which the electric furnace dust has been generated. The reason is as follows. Electric furnace dust generated from a steelmaking electric furnace contains alloy elements dependent on a steel type produced by the steelmaking electric furnace, such as Mn, Mo, Nb, Ni, Cu, V, Ti and W, and other elements, such as Al, B, Co, Cr, La, Pb, Se, Te and Zr. In the recycling, if these elements are mixed with a different type of steel from that of original steel, they will simply become impurity elements. Differently, if they are mixed with the same type of steel as that of original steel, they can contribute to enhancement in economic efficiency and effective utilization of resources. For example, electric furnace dust generated from a steelmaking electric furnace for producing high Mn alloy steel contains a large amount of Mn, and therefore recycling the furnace electric furnace dust to a steelmaking electric furnace for producing the same type of steel enables the Mn to be effectively collected in the form of reduced iron. On the contrary, since electric furnace dust generated from a specific steelmaking electric furnace for producing high Cu molten steel contains a large amount of Cu, and therefore returning this electric furnace dust to a steelmaking electric furnace for producing various types of steel in the form of reduced iron will simply and undesirably increases impurity elements. It is therefore preferable that a reduced ion briquette formed from a powdery mixture containing the electric furnace dust is returned to the specific steelmaking electric furnace in which the electric furnace dust has been generated.

(Modification)

Although the rotary hearth furnace 5 in the above embodiment is installed adjacent to the steelmaking electric furnace 1, the present invention is not limited to this arrangement, but may be applied to an arrangement where the rotary hearth furnace 5 is installed in a location away from the steelmaking electric furnace 1.

The installation of the rotary hearth furnace 5 adjacent to the steelmaking electric furnace 1 eliminates a need for transportation of the electric furnace dust A from the steelmaking electric furnace 1 to the rotary hearth furnace 5, thus offering an effect of eliminating a need for pelletization thereof to prevent dusting as in a conventional manner, and addition of water for the pelletization.

On the other hand, the installation of the rotary hearth furnace 5 in a location away from the steelmaking electric furnace requires transportation of the electric furnace dust A from the steelmaking electric furnace 1 to the rotary hearth furnace 5. In this case, as transportation means may be employed an aeration-blow type powder/granular material-transporting tank truck, such as JET PAC truck. This offers an effect of eliminating a need for pelletization for the transportation and addition of water for the pelletization.

The JET PAC truck is one that comprises a sealed tank and has a function of transporting a powder material in dried form without scattering. Loading the electric furnace dust from the dust collector into the tank of the JET PAC truck can be performed by means of gravity falling, or fluidization of the electric furnace dust using air or the like. Further, transference of the electric furnace dust from the tank of the JET PAC truck to the storage tank can also be performed by means of fluidization of the electric furnace dust using air or the like.

Although, in the above embodiment, molasses is added as the binder C in the briquetting process, more preferably is added a fibrous binder, such as paper fluff fibers, straw fibers or silicon fibers. Such fibers are dispersed in a raw briquette to allow water vapor to be readily released along the fibers so as to reduce a water vapor pressure in an inside of the briquette. This provides more enhanced bursting-resistant characteristic (see the after-mentioned Example 2).

Although, in the above embodiment, only one type of electric furnace dust A is used, a mixture of plural types of electric furnace dusts may be used. Further, in addition to the electric furnace dust may be used a mixture prepared by mixing another steel mill dust such as blast furnace dust, converter dust or mill scale, and/or iron ore.

In the above embodiment, a coke powder is used as the carbonaceous material B; alternatively, coal, petroleum coke, charcoal, wood chip, waste plastic or waste tire, may also be used.

In the above embodiment, the water content in the powdery mixture D is adjusted by no addition of water or addition of a minimum amount of water during the mixing in the mixer 3; alternatively, the water content in the powdery mixture D may be adjusted by pre-drying the electric furnace dust A, or by mixing additional dust, such as electric furnace dust, having a relatively low water content, when the electric furnace dust A has such an excessively high water content that the direct use of the electric furnace dust A makes the water content in the powdery mixture D greater than 3 mass %. On the other hand, when the electric furnace dust A has such an excessively low water content that the direct use of the electric furnace dust A makes the water content in the powdery mixture D less than 0.5 mass %, the water content in the powdery mixture D may be adjusted by mixing additional dust, such as electric furnace dust, having a relatively high water content, instead of or in addition to the addition of water in the mixer 3.

Example 1

(Influence of Water Content)

The following test was carried out to check an influence of a water content in a raw briquette (powdery mixture) on a bursting-resistant characteristic.

In this test, plural types of powdery mixtures were produced in such a manner that 87.5 mass parts of electric furnace dust and 12.5 mass parts of CDQ powder (coke powder) serving as a carbonaceous material, each of which has an average particle size and a chemical composition as shown in the following Table 1, and molasses added thereto as a binder in a given amount were mixed together with added water thereto by a mixer while an amount of the added water was variously changed. In this test, the electric furnace dust and the CDQ powder, each of which was in a dried state, were directly used without being dried.

TABLE 1

| (a) | | |
|---|---|---|
| Item | Unit | Electric Furnace Dust |
| Average particle size* | μm | 0.54 |
| Composition | | |
| T. Fe | mass % | 31.0 |
| Zn | mass % | 32.0 |
| Pb | mass % | 0.8 |
| C | mass % | 0.3 |
| S | mass % | 0.2 |
| $SiO_2$ | mass % | 6.0 |
| CaO | mass % | 10.0 |

| (b) | | |
|---|---|---|
| Item | Unit | CDQ powder |
| Average particle size* | μm | 82.25 |
| Industrial analysis value | | |
| volatile matter content | mass % | 1.3 |
| ash content | mass % | 12.1 |
| fixed carbon | mass % | 86.6 |
| Elemental analysis | | |
| C | mass % | 85.1 |
| H | mass % | 0.90 |
| N | mass % | 1.19 |
| S | mass % | 0.70 |
| O | mass % | 0.01 |

*Average particle size: a particle size at a point where a cumulative curve obtained for a certain powder having a particle size distribution on an assumption that a total volume of the powder is 100% indicates 50%; the particle size was measured by a microtrack method.

Each of the powdery mixtures was compacted at a linear pressure 44 kN/cm using a twin-roll type briquetting machine having a roll diameter of 520 mm, a roll width of 200 mm and a pocket size of 30 mm length×25 mm width×7 mm depth. Thus, a raw briquette having a volume of 10 $cm^3$ was produced.

Then, the following rapid heating test was carried out to figure out a bursting-resistant characteristic. In this test, four raw briquettes were placed on a lightweight alumina tray, charged into a horizontal heating furnace substituted with a $N_2$ atmosphere so as to reach a soaking area therein having a temperature of 1300° C. within 2 seconds, and held at the position in the soaking area to be heated for such a given time that a reduction rate of iron contained in each of the briquettes becomes 90% or more. Thereafter, the reduced iron briquettes were transferred to a cooling zone of the horizontal heating furnace to be cooled to a normal temperature within a $N_2$ atmosphere. The cooling is followed by taking out the reduced iron briquettes, separating small particles each having a particle size of 3.35 mm or less (this will also be described as "−3.35 mm") from the reduced iron briquettes using a sieve, and evaluating the bursting-resistant characteristic based on an amount of the small particles. Specifically, a 5 mass % or less ratio of the small particles each having a particle size of 3.35 mm or less allows the bursting-resistant characteristic to be evaluated good (the mark ○ in Tables 2 and 3). This evaluation method was formulated in consideration of a fact that even a reduced iron briquette with crack can be practically used as a product reduced iron briquette as long as the metal iron is so sintered as not to be separated as small pieces.

A result of the measurement is shown in the following Table 2.

TABLE 2

| | Mixing Condition of Raw Briquette | | Rapid Heating Test | |
|---|---|---|---|---|
| Test No. | amount of molasses (mass part*) | water content (mass %**) | ratio of 3.35 mm (mass %) | bursting-resistant characteristic |
| 1-1 | 3 | 3 | 1.1 | ○: All reduced iron briquettes are healthy |
| 1-2 | 3 | 8 | 38.7 | X: All reduced iron briquettes lose their original shape |
| 1-3 | 5 | 5 | 25.0 | X: One-half of briquettes are healthy after holding time of 30 seconds |

*: A value which is not included in 100 mass pars of [electric furnace dust + CDQ powder]
**: A value which is not included in a total mass of [electric furnace dust + CDQ powder + molasses]
○: A ratio of −3.35 mm is 5 mass % or less;
X: A ratio of −3.35 mm is greater than 5 mass %

The result in the Table 2 shows that a water content of a raw briquette (powdery mixture) greater than 3 mass % renders it difficult to prevent bursting even with an increase in an amount of binder (see Test Nos. 1-2 and 1-3), while a water content of the raw briquette (powdery mixture) limited to 3 mass % or less enables prevention of the bursting (see Test No. 1-1).

Example 2

(Influence of Type of Binder)

The following test was carried out to check an influence of a type of binder on a crushing strength and a bursting-resistance characteristic of a raw briquette.

With use of various binders as shown in the following Table 3 as a binder in place of molasses in Example 1, plural types of raw briquettes were produced in the same apparatus and under the same conditions as those in Example 1, and subjected to a measurement of crushing strength and a rapid heating test.

In this test, the crushing strength of a briquette was obtained by a measurement test according to ISO 4700. In the measurement test, a compression load is applied to a briquette laid horizontally, in a thicknesswise direction thereof, and a minimum load at a time of breakage of the briquette was measured, wherein an average of respective measured values for ten briquettes was calculated as the crushing strength.

A result of the measurement is shown in the following Table 3 together with a mixing condition. In this Table, "kgf" as a unit of the crushing strength corresponds to 9.80665 N.

TABLE 3

| | Mixing Condition of Raw Briquette | | | Properties of Raw Briquette | | |
|---|---|---|---|---|---|---|
| Test No. | Type of binder | amount of binder (mass part*) | water content (mass %**) | crushing strength (kgf/briquette) | apparent density (g/cm³) | bursting-resistant characteristic |
| 2-1 | paper fluff | 1 | 1 | 32.6 | 2.45 | ○ |
| 2-2 | straw | 1 | 1 | 12.7 | 2.28 | ○ |
| 2-3 | straw | 3 | 1 | 24.9 | 2.32 | ○ |
| 2-4 | silicon fiber | 1 | 1 | 15.2 | 2.47 | ○ |
| 2-5 | cornstarch | 1 | 4 | 15.8 | 2.51 | X |
| 2-6 | no addition | 0 | 1 | 16.6 | 2.41 | X |

*: A value which is not included in 100 mass pars of [electric furnace dust + CDQ powder]
**: A value which is not included in a total mass of [electric furnace dust + CDQ powder + molasses]
○: A ratio of −3.35 mm is 5 mass % or less;
X: A ratio of −3.35 mm is greater than 5 mass %

The result in the above Table 3 shows that addition of a given amount of binder is required because addition of no binder makes the bursting-resistant characteristic poor even with limitation of the water content to the range (0.5 to 3 mass %) defined in the present invention (see Test Nos. 2-6).

Further, comparison of the respective results in the Tables 2 with that in the Table 3 makes it clear that excellent bursting-resistant characteristic requires addition of molasses in an amount of about 3 mass %, whereas addition of a fibrous binder (paper fluff fibers, straw fibers or silicon fibers) is required only in an amount of about 1 mass % (see Test Nos. 1-1, 2-1, 2-2 and 2-4), thus showing that use of the fibrous binder enables the bursting-resistant characteristic to be significantly improved.

Example 3

(Influence of Compacting Pressure)

The following test was carried out to check an influence of a compacting pressure on a crushing strength and a dropping strength of a raw briquette.

In this test, with use of paper fluff fibers as a binder, plural types of raw briquettes were produced under the same mixing condition as that of Test No. 2-1 in the Table 2 and in the same apparatus as that in Examples 1 and 2, while a compacting pressure was changed in sequence. Then, a crushing strength and a dropping strength of each of the raw briquettes were measured.

The dropping strength of a raw briquette herein means a mass rate (%) of oversize fractions of five raw briquettes which had been dropped from a height of 5 m onto an iron plate, screened by use of a sieve having an opening of 6.35 mm.

Figure 2:
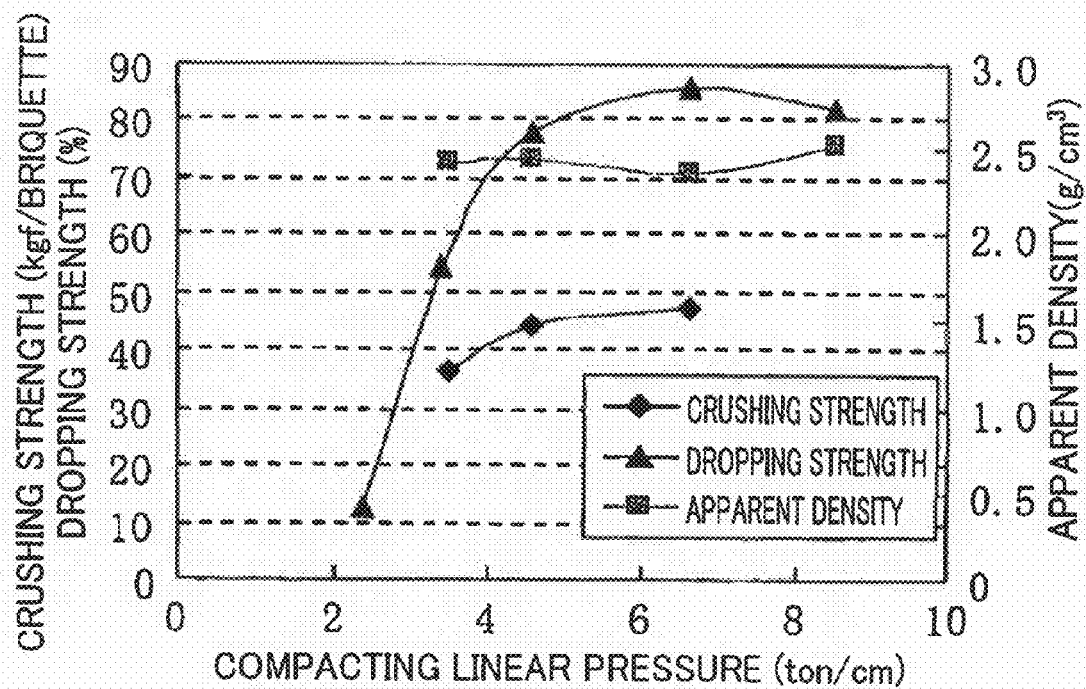
FIG. 2 is a graph showing a relationship between a compacting linear pressure of a briquetting machine in the reduction treatment system, and each of a crushing strength and a dropping strength of a raw briquette formed by the briquetting machine.

A result of the measurement is shown in FIG. 2, wherein "ton" as a unit of a linear pressure corresponds to 9.80665 kN.

As shown in FIG. 2, in a low linear pressure region, an increase in compacting linear pressure of the briquetting machine increases both the crushing strength and the dropping strength of the raw briquette, whereas, in a region where the linear pressure is about 4.5 ton/cm or more, each of the crushing and dropping strengths tends to be saturated and then reaches a maximum value at about 6.5 ton/cm. This result teaches that the compacting linear pressure is preferably set at 44 kN/cm (about 4.5 ton/cm) or more, more preferably 64 kN/cm (about 6.5 ton/cm) or more, in order to obtain a sufficient briquette strength (crushing strength and dropping strength).

As above, the present invention provides a method for reduction treatment of electric furnace dust. This method comprises a mixing step of adding a carbonaceous material, a binder, and water (if needed), to electric furnace dust generated in a steelmaking electric furnace, to form a powdery mixture having a water content of 0.5 to 3 mass %, a compacting step of compacting the powdery mixture into a raw briquette, and a reduction step of charging the raw briquette without drying into a rotary hearth furnace and thermally reducing the raw briquette to obtain a reduced iron briquette and a crude zinc oxide, thus allowing the water content in the powdery mixture comprising the electric furnace dust and the carbonaceous material to be set in an adequate range to ensure a handling strength of the raw briquette, and preventing bursting in the rotary hearth furnace in spite of omission of a pre-drying treatment. This makes it possible to prevent formation of deposit on a hearth in the rotary hearth furnace and occurrence of a large amount of dust loss, thus offering stable production with high yield. In addition, as compared with the conventional technique based on pelletization, the method of the present invention based on briquetting enables significant reductions in the water content of raw briquette and energy necessary for drying of the raw briquette, thus allowing the reduction treatment of electric furnace dust to be performed at lower cost.

In the method of the present invention, the rotary hearth furnace may be installed adjacent to the steelmaking electric furnace. In this case, it is not necessary to transport electric furnace dust from the steelmaking electric furnace to the rotary hearth furnace. This can offer an effect of eliminating a need for pelletization to prevent dusting as in a conventional manner and addition of water for the pelletization.

Even in cases where the rotary hearth furnace is installed in a location away from the steelmaking electric furnace, transportation of electric furnace dust from the steelmaking electric furnace to the rotary hearth furnace by use of an aeration-blow type powder/granular material-transporting tank truck such as JET PAC truck can offer an effect of eliminating a need for pelletization for transportation and addition of water for the pelletization.

The compacting step may include using a twin-roll type briquetting machine, a compacting linear pressure of which is set at 44 kN/cm or more. This makes it possible to obtain a briquette having a sufficient strength with respect to both a crushing strength and a dropping strength.

The mixing step may include adding a fibrous binder as the binder. The mixed fibers are dispersed in a briquette to facilitate release or escape of water vapor so as to reduce a water vapor pressure in an inside of the briquette, which enhances bursting-resistant characteristic.

The method of the present invention may further include a step of returning the reduced iron briquette formed from the powdery mixture containing electric furnace dust to the steelmaking electric furnace in which the electric furnace dust has been generated. This enables efficient collection of an element contained in the electric furnace dust to contribute to enhancement in economic efficiency and effective utilization of resources.

What is claimed is:

1. A method for reducing an electric furnace dust, comprising:
   mixing at least a carbonaceous material and a binder with an electric furnace dust generated in a steelmaking electric furnace to form a powdery mixture having a water content of 0.5 to 3 mass %;
   compacting the powdery mixture with a briquetting machine at a linear compacting pressure of 44 kN/cm or more to form a raw briquette; and
   charging the raw briquette without drying into a rotary hearth furnace and thermally reducing the raw briquette to form a reduced iron briquette and a crude zinc oxide.

2. A method for performing a reduction treatment of electric furnace dust, comprising:
   adding at least a carbonaceous material and a fibrous binder to electric furnace dust generated in a steelmaking electric furnace, and mixing to form a powdery mixture having a water content of 0.5 to 3 mass %;
   compacting said powdery mixture into a raw briquette with a briquetting machine at a compacting linear pressure of 44 kN/cm or more; and
   charging said raw briquette without drying into a rotary hearth furnace and thermally reducing said raw briquette to obtain a reduced iron briquette and a crude zinc oxide.

3. The method as defined in claim 2, wherein said mixing includes adding, in addition to said carbonaceous material and said binder, water necessary for allowing the water content in said formed powdery mixture to fall within the range of 0.5 to 3 mass %.

4. The method as defined in claim 2, wherein said rotary hearth furnace is installed adjacent to said steelmaking electric furnace.

5. The method as defined in claim 2, wherein said electric furnace dust is transported from said steelmaking electric furnace to said rotary hearth furnace by an aeration-blow type powder/granular material-transporting tank truck.

6. The method as defined in claim 2, wherein said compacting is carried out with a twin-roll type briquetting machine.

7. The method as defined in claim 2, wherein said mixing further includes adding a fibrous binder as said binder.

8. The method as defined in claim 2, which further includes returning said reduced iron briquette formed from said powdery mixture containing electric furnace dust, to said steelmaking electric furnace in which said electric furnace dust has been generated.

9. The method as defined in claim 2, further comprising:
adjusting the water content in the powdery mixture by pre-drying the electric furnace dust when the electric furnace dust has a water content that without the pre-drying is greater than 3 mass %.

10. The method as defined in claim 2, further comprising:
adjusting the water content in the powdery mixture by mixing an additional dust with the powdery mixture when the electric furnace dust has a water content that without the additional dust is greater than 3 mass %.

11. The method as defined in claim 2, further comprising:
adjusting the water content in the powdery mixture by mixing an additional dust with the powdery mixture when the electric furnace dust has a water content that without the additional dust is less than 0.5 mass %.

12. The method as defined in claim 2, further comprising pre-drying the electric furnace dust such that the water content in the powdery mixture is 0.5 to 3 mass %.

13. The method as defined in claim 2, further comprising mixing an additional dust having a relatively low water content with the powdery mixture such that the water content in the powdery mixture is 0.5 to 3 mass %.

14. The method as defined in claim 2, further comprising mixing additional dust having a relatively high water content with the powdery mixture such that the water content in the powdery mixture is 0.5 mass % to 3 mass %.

* * * * *